(12) United States Patent
Sakamoto

(10) Patent No.: US 6,323,716 B1
(45) Date of Patent: Nov. 27, 2001

(54) SIGNAL DISTRIBUTING CIRCUIT AND SIGNAL LINE CONNECTING METHOD

(75) Inventor: Fumihiko Sakamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/401,331

(22) Filed: Sep. 23, 1999

(30) Foreign Application Priority Data

Sep. 28, 1998 (JP) .................................................. 10-272730

(51) Int. Cl.$^7$ .................................................. H03K 17/62
(52) U.S. Cl. .............................................. 327/415; 327/99
(58) Field of Search .................................. 327/291, 292, 327/293, 295, 296, 403, 415, 171, 165, 99

(56) References Cited

U.S. PATENT DOCUMENTS

| | | | |
|---|---|---|---|
| 4,447,870 | 5/1984 | Tague et al. | 364/200 |
| 5,519,351 | * 5/1996 | Matsumoto | 327/295 |
| 5,656,963 | * 8/1997 | Masleid et al. | 327/297 |
| 5,852,378 | * 12/1998 | Keeth | 327/171 |
| 5,923,188 | * 7/1999 | Kametani et al. | 326/93 |
| 6,037,820 | * 3/2000 | Ishizaka | 327/295 |
| 6,081,148 | * 6/2000 | Song | 327/292 |

FOREIGN PATENT DOCUMENTS

| | | |
|---|---|---|
| 57-79536 | 5/1982 | (JP). |
| 4-205326 | 7/1992 | (JP). |
| 4-229634 | 8/1992 | (JP). |
| 4-283814 | 10/1992 | (JP). |
| 5-233093 | 9/1993 | (JP). |
| 6-244282 | 9/1994 | (JP). |
| 7-230336 | 8/1995 | (JP). |
| 9-97123 | 4/1997 | (JP). |
| 9-283631 | 10/1997 | (JP). |

OTHER PUBLICATIONS

A. Shibayama et al., "Device–Deviation Tolerant over–1GHz Clock Distribution Scheme with Skew–Immune Race–Free Impulse Latch Circuits", *Digest of Technical Papers,* 1998 IEEE International Solid–State Circuits Conference, pp. 402–203.
Nikkei Sangyo Shimbun, Feb. 9, 1998.
Nikkei Electronics No. 709, Feb. 9, 1998, p. 109.

* cited by examiner

Primary Examiner—My-Trang Nu Ton
(74) Attorney, Agent, or Firm—Sughrue, Mion, Zinn, Macpeak & Seas, PLLC

(57) ABSTRACT

A signal distributing circuit of the invention includes a first element which outputs a first signal and a second signal which is opposite to that of the first signal. The circuit is provided with a first signal line on which the first signal is transmitted and a second signal line on which the second signal is transmitted. A plurality of second elements each of which is connected to the first signal line in a first order and connected to the second signal line in a second order, wherein the second order is opposite to that of the first order. A method for connecting a plurality of loads to first and second signal lines, which are allocated to a regular signal and a signal opposite to that of the regular signal, respectively, of the invention includes connecting the loads to the first signal lines in a first order; and connecting the loads to the second signal lines in an order opposite to that of the first order.

14 Claims, 9 Drawing Sheets

SIGNAL DISTRIBUTING CIRCUIT AND SIGNAL LINE CONNECTING METHOD

BACKGROUND OF THE INVENTION

The present invention relates to a signal distributing circuit and a signal line connecting method, and more particularly, to a signal distributing circuit and a signal line connecting method which prevent or reduce skew, the time difference when a signal to be distributed is input into each of a plurality of loads.

A signal distributing circuit is configured to distribute a signal to many loads (circuits). Loads (circuits) are, for example, internal circuits (flip-flops and the like) in a data processing device which can be large such as a supercomputer, or small such as a microprocessor (integrated circuit), and the like. In a synchronous data processing device which is configured such that many internal circuits (flip-flops and the like) operate synchronously with one another, a signal distributing circuit is typically used for distributing a clock signal which is used as a basis for providing the timing for synchronizing the respective internal circuits with one another.

In such a signal distributing circuit, skew is caused by the difference in signal propagation time due to ununiformity of signal distributing paths to the respective loads. Therefore it is necessary to reduce skew to attain a high performance device.

Skew creates a timing problem in a synchronous data processing device because a clock distributing circuit may provide skew of a clock signal to different parts inside the device. In order to prevent this problem, the device must be operated by a clock cycle time that can guarantee that each data signal can reach destination internal circuits (flip-flop for example) before a clock reaches them, even assuming a large amount of skew. The greater the skew, the longer the clock cycle time must become. If the clock cycle time becomes longer, however, the operation speed of the device is reduced.

One cause of skew in a signal distributing circuit is the difference in signal propagation time generated among the respective portions in the circuit due to variations in the manufacturing process. In a clock distributing circuit whose circuit scale extends over the entire device, a serious problem is created because a particularly large skew is generated.

This problem can be solved by manufacturing more uniform circuits by improving the manufacturing process of the circuits, and as a result, creating less variation among the respective portions in the circuits. However, because the cost of manufacturing these uniform circuits is higher than the normal manufacturing process, this method is economically impractical.

The other cause of skew is the difference in signal propagation time caused by the ununiformity of signal distributing paths each connecting between portions of the circuit. When a clock distributing circuit is provided in a large-scale synchronous data processing device, another serious problem is created because there are a number of clock distributing paths over the entire device.

FIG. 5 shows a first conventional signal distributing circuit which address the above problems as disclosed in Japanese Patent Application Laid-open Hei No.4-205,326. The circuit includes a tree-type hierarchy in which a layer-to-layer connection from the upper to the lower layer is a one-to-one connection.

In FIG. 5, a main oscillator 10 supplies a synchronizing clock signal to each of processors 130 in a manner of a tree structure through m distributors 110, each of which distributes the clock signal to m parts, and n distributors, each of which distributes it to n parts.

In the first conventional circuit, because each connection between layers from the upper to the lower layer is a one-to-one connection and each layer requires the distributor, the number of distributors increase proportionally as the number of loads (processors) increase, thus the scale of the entire circuit becomes factorially large. As the result, skew, which is caused by variation in the characteristic of the distributing paths, increases proportionally as the number of loads (processors) increase. In addition, because the number of layers of the entire circuit need to be changed when the number of loads (processors) change greatly, it is not easy to change the number of loads (processors). While the scale of the entire circuit can be kept small by making each layer-to-layer connection from the upper to the lower layer into a one-to-n (plural loads) connection, skew becomes larger due to a propagation delay time difference between signals influenced by the order of connection of the respective loads in each layer-to-layer connection or due to noise caused by multiple reflections of a propagated signal wave between the respective loads.

U.S. Pat. No. 4,447,870 discloses a technique for manually adjusting (or controlling by an operator) a signal (clock) distributing circuit (hereinafter, refered to a second conventional circuit).

In the second conventional circuit, a problem occurs because a manual or operator control adjustment is required and, particularly, in a large-scale device, it is necessary to manage delay quantities by adjusting each of the many circuits in each signal distributor layer. This increases man power or equipment. In addition, there is another problem that skew, which is caused by a factor which occurs later such as a temperature change, cannot be compensated by an initial skew adjustment.

Japanese Patent Application Laid-open publication Hei No. 4-205,326 also discloses a signal distribution circuit of a third conventional circuit.

In FIG. 6A, the circuit includes a main oscillator 10, and two transmission lines, a forward transmission line A, and a backward transmission line B, which are opposite to each other in transmission direction and are connected to main oscillator 10. Transmission line A is bent at point a and transmission line B is bent at point b so that they are symmetrical to each other with respect to main oscillator 10, and they are arranged to be adjacent to each other, opposite in transmission direction and parallel with each other within a specified length L0. Processors 20, 30, . . . , and N are connected to transmission lines A and B. Although connecting points of each processors and transmission lines A and B are shown at positions slightly apart from each other as shown in FIG. 6A, the points are at the same positions on transmission lines A and B.

As represented by a processor 20, each of the processors includes a phase difference detecting element 200 and a clock oscillating element 300. Clock signals from transmission lines A and B are input to phase difference detecting element 200. Phase difference detecting element 200 detects a phase difference between the clock signals. Clock oscillating element 300 generates a clock signal for controlling a processor based on the phase difference between the clock signals detected by phase difference detecting element 200.

Next, the operation of the third conventional circuit will be described.

The two transmission lines A and B are supplied with clock signals from main oscillator 10. Transmission line A has a clock signal input from the processor N side and transmission line B has a clock signal input from the processor 20 side. Since transmission lines A and B have a uniform characteristic, the delay amount of transmission line A increases linearly as shown by a straight line A in FIG. 6B from a reference point a, while the delay amount of transmission line B increases linearly as shown by a straight line B in FIG. 6B from a reference point b.

Processor 20 inputs clock signals from point $a_n$ of transmission line A and point $b_1$ of transmission line B. Because the delay amount of the clock at point $a_n$ is as shown in FIG. 6B as point $a_n$ on the straight line A and the delay amount of the clock at point $b_1$ on transmission line B is as shown in FIG. 6B as point $b_1$ on the straight line B, their middle point n can be obtained by adding the delay amounts of points $a_n$ and b1 and halving the added result.

Clock signals transmitted by transmission line A and B have a delay of a certain ratio starting from the starting points of transmission lines A and B, respectively. Therefore, middle point n is constant at any corresponding position where transmission lines A and B are arranged in parallel. Thus, every processor can obtain the same clock signal by reproducing a clock signal at the processor side by taking the phase difference at middle point n as a reference phase.

FIG. 7 shows the detailed configuration of processor 20. The same numbers are given to the same components as FIG. 6, and the detailed description of these components is omitted.

Phase difference detecting element 200 includes a phase difference detector 210 and a multiplier 220 which halves an input. Clock oscillating element 300 includes a phase difference detector 310, an adder 320, a variable oscillator 330 and a frequency divider 340.

Assuming that the distances between main oscillator 10 and processor 20 are La and Lb on transmission lines A and B, respectively, and a delay amount per unit length of the transmission line is τ, a phase difference signal Δφ which is an output of phase difference detecting element 200 is:

$$\Delta\phi = \tau \cdot (La-Lb)/2.$$

The phase difference detector 310 receives an output of the variable oscillator 330 and a clock signal from transmission line B. Adder 320 adds an output of the phase difference detector 310 and an output Δφ of phase difference detecting element 200. Variable oscillator 330 receives an output of the adder 320 and feeds back its output through the frequency divider 340 to said phase difference detector 310. Clock oscillating element 300, which is comprised of items 310,320, 330 and 340, forms a phase lock loop (PLL), and the phase φ of the PLL is:

$$\phi = \phi b + \Delta\phi.$$

Here, φb is a delay amount from main oscillator 10 to processor 20 on transmission line B, and therefore, is represented as follows:

$$\phi b = \tau \cdot Lb.$$

Assuming that L is the sum of lengths of transmission lines A and B to the position where the processor is connected, the following result is obtained:

$$L = La + Lb,$$

and eventually φ is represented as follows:

$$\phi = \tau \cdot L/2.$$

L is determined as a constant value when transmission lines A and B are determined and according to this expression, even when the processor is connected to any position on transmission lines A and B arranged in parallel, a clock signal having a constant phase is always output from clock oscillating element 300.

In the third conventional circuit, a problem is created because complicated equipment such as a phase difference detecting element and a clock oscillating element is required to be contained inside each processor.

ISSCC98(1998 IEEE International Solid-State Circuits Conference) discloses a signal distributing circuit of a fourth conventional circuit.

A fundamental idea of the fourth conventional circuit is disclosed in an article of Nikkei Sangyo Shimbun dated Feb. 9th, 1998.

In FIG. 8, an integrated circuit 600, which is the signal distributing circuit, includes two ring-shaped clock signal lines 700A and 700B which are arranged along the circumference of integrated circuit 600 and which have transmission directions opposite to each other. A clock signal input into integrated circuit 600 is distributed by clock signal lines 700A and 700B to local clock generating circuits 710 which is disposed distributively in integrated circuit 600. Each local clock generating circuit 710 generates a local clock signal from an input clock signal and distributes it to a plurality of loads (flip-flops and the like) inside integrated circuit 600.

FIG. 9 shows a detailed signal distributing circuit of the fourth conventional circuit, which is also disclosed in Nikkei Electronics No. 709 (page 109, Feb. 9th, 1998, Nikkei Business Publications, Inc.).

The circuit includes two ring-shaped clock signal lines 700A and 700B which are clockwise and counterclockwise, respectively, which is equivalent to forward transmission line A and backward transmission line B of the third conventional circuit. A plurality of local clock generators (hereinafter referred to as LCG) 710 corresponding to the plurality of processors of the third conventional circuit are connected to these two ring-shaped clock signal lines 700A and 700B.

Each LCG 710 is provided with a phase comparator 711 (phase difference detecting part), and clock signals from clock signal lines 700A and 700B, a clockwise clock signal and a counterclockwise clock signal, are input to LCG 710.

Phase comparator 711 detects a phase difference between the clockwise clock signal and the counterclockwise clock signal. Each local clock generator LCG 710 generates a local clock signal to be distributed to a plurality of loads inside integrated circuit 600 based on the phase difference detected by phase comparator 711.

In the fourth conventional circuit, like the third conventional circuit, it is necessary to also include complicated equipment such as a phase comparator 711 and the like inside each LCG 710. This creates a problem because the size of the circuit increases.

SUMMARY OF THE INVENTION

An object of the invention is to provide a signal distributing circuit and a signal line connecting method which prevent or reduce skew.

Another object of the invention is to provide a signal distributing circuit and a signal line connecting method which are implemented by a simple composition.

Another object of the invention is to provide a signal distributing circuit and a signal line connecting method which easily cope with configuration changes such as a change in the number of loads and the like.

According to one aspect of the present invention, a signal distributing circuit is provided which includes: a first element which outputs a first signal and a second signal which is opposite to that of the first signal; a first signal line on which the first signal is transmitted; a second signal line on which the second signal is transmitted; and a plurality of second elements each of which is connected to the first signal line in a first order and connected to the second signal line in a second order, wherein the second order is opposite to that of the first order.

According to another aspect of the present invention, a signal distributing circuit is provided which includes: a first element which outputs a first signal and a second signal which is a reverse signal of the first signal; a first signal line on which the first signal is transmitted; a second signal line on which the second signal is transmitted; and a plurality of second elements each of which inputs the first signal from the first signal line and the second signal from the second signal line, wherein the times when the levels of the first signal and the second signal are equal, or substantially equal, are coincident, or substantially coincident, in every second element.

According to another aspect of the present invention, a method for connecting a plurality of loads to first and second signal lines, which are allocated to a regular signal and a signal opposite to that of the regular signal, respectively, is provided which includes: connecting the loads to the first signal lines in a first order; and connecting the loads to the second signal lines in an order opposite to that of the first order.

BRIEF DESCRIPTION OF THE DRAWINGS

Other features and advantages of the invention will be made more apparent by the following detailed description and the accompanying drawings, wherein.

In the drawings, the same reference numerals represent the same structural elements.

DETAILED DESCRIPTION OF THE PREFERRED EMBODIMENTS

Figure 1:
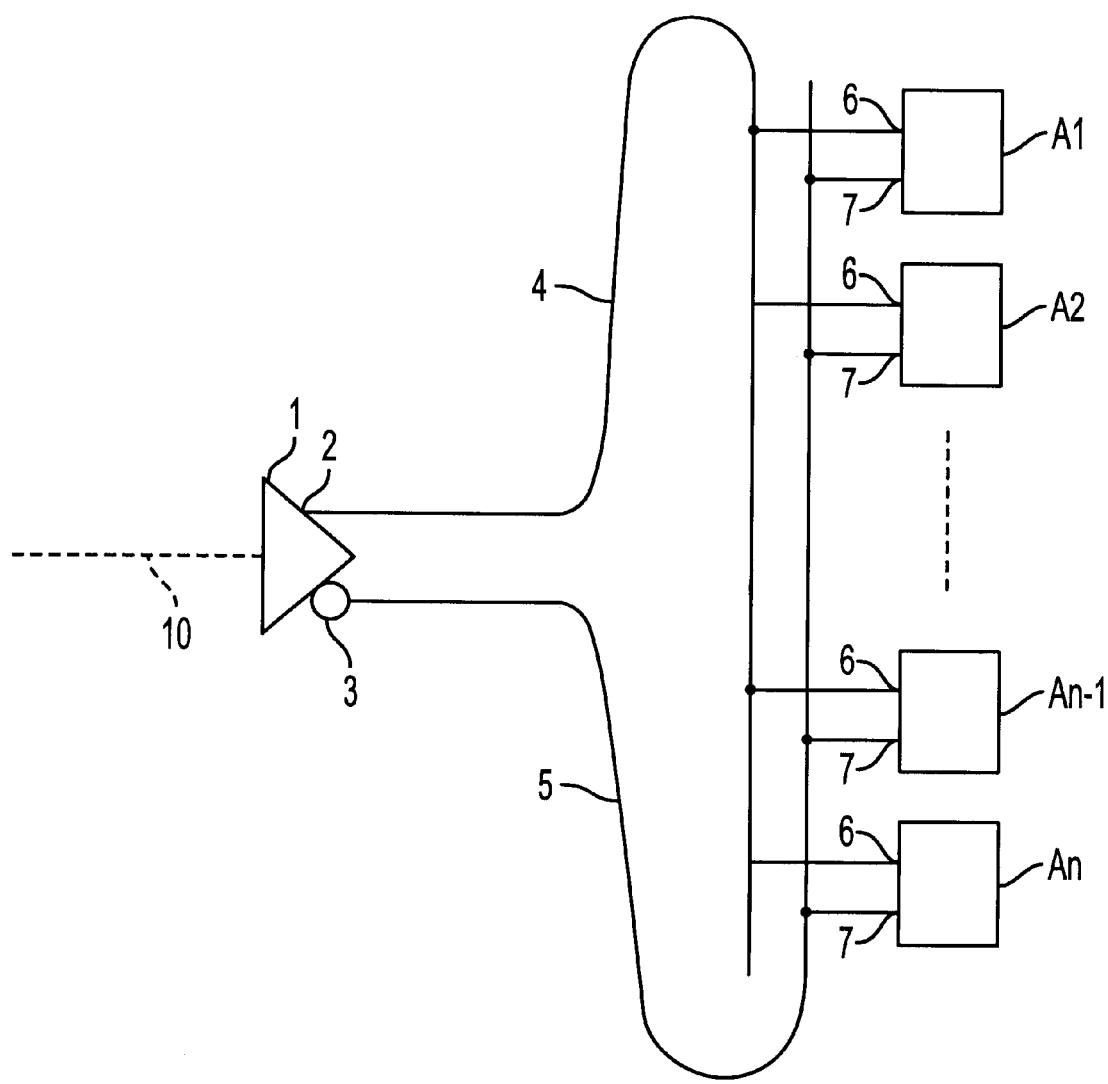
FIG. 1 is a block diagram of the first embodiment of the present invention.

A first embodiment of the present invention will be described in detail below.

A signal distributing circuit includes a driver 1 and a plurality of loads A1 to An. Each of loads A1 to An is a differential input circuit having a positive input terminal 6 and a negative input terminal 7.

Driver 1 is a differential output circuit. Driver 1 receives a signal through a signal line 10 from an unillustrated signal source. Driver 1 has a positive output terminal 2 which outputs a regular signal and a negative output terminal 3 which outputs a signal opposite to that of the regular signal. Positive output terminal 2 is connected to positive input terminals 6 of loads A1 to An through a signal line 4 in order of the loads A1, A2, . . . , An–b 1and An. Negative output terminal 3 is connected to negative input terminals 7 of loads A1 to An through a signal line 5 in an opposite order of the above-mentioned connection between positive terminal 2 and positive terminals 6, namely, in order of loads An, An–1, . . . , A2 and A1.

As for the differential output circuit which forms an output part of driver 1 and the differential input circuit which forms an input part of each of the plural loads A1, A2, . . . , An–1 and An, there are many examples well known to those skilled in the art, and any of them can be used for the present invention. While a connecting point of signal line 4 and positive input terminal 6 and a connecting point of signal line 5 and negative input terminal 7 of each load are shown in FIG. 1 as if they are apart from each other for the sake of explanation, the points are at the same positions on signal lines 4 and 5 which are arranged in parallel with each other.

Next, the operation of the embodiment will be described.

Figure 2:
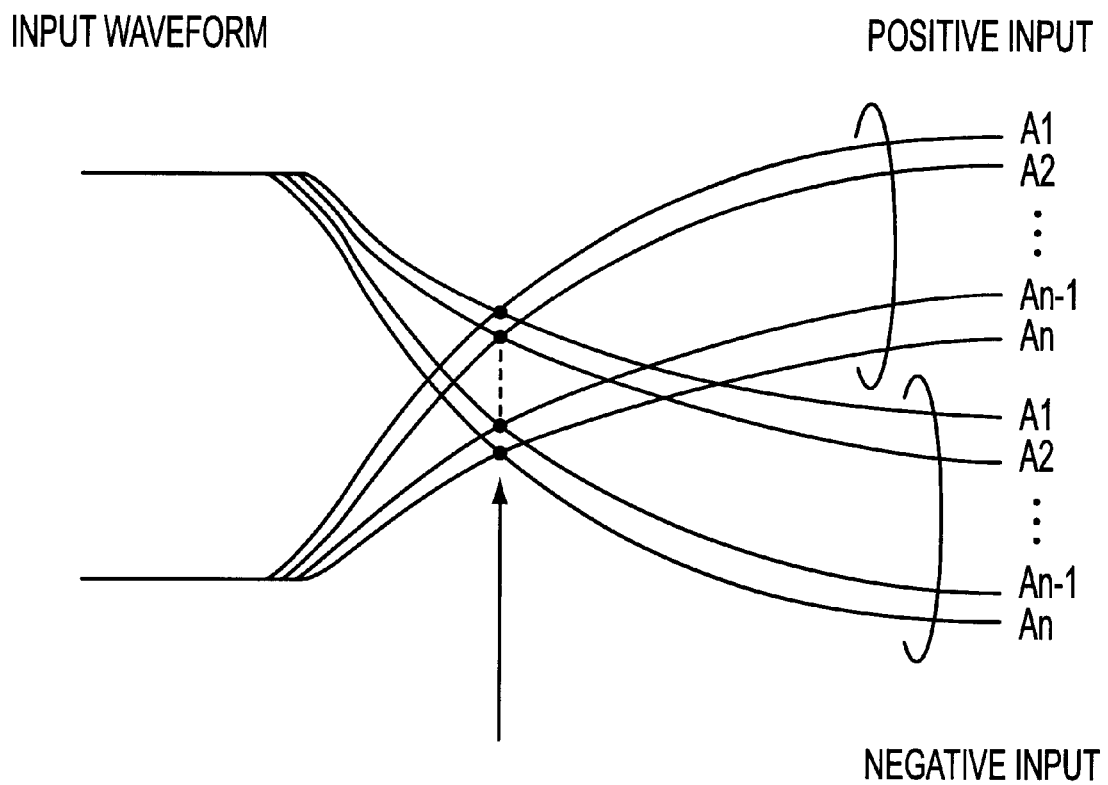
FIG. 2 is a signal waveform diagram of the first embodiment.

Referring to FIG. 2, the transition times of signals at positive input terminals 6 of the respective loads A1, A2, . . . , An–1 and An become gradually longer in order of A1, A2, . . . , An–1 and An. This is because each of positive input terminals 6 is sequentially connected to positive output terminal 2 through signal line 4 in order of the loads A1, A2, . . . , An–1 and An.

On the other hand, the transition times of signals at negative input terminals 7 of the respective loads A1, A2, . . . , An–1 and An become gradually longer in order of An, An–1, . . . , A2 and A1. This order is opposite to the order of the above-mentioned connection between positive terminal 2 and positive input terminals 6. This is because each of negative input terminals 7 is sequentially connected to negative output terminal 3 through signal line 5 in order of loads An, An–1, . . . , A2 and A1.

Accordingly, as shown in FIG. 2, the prolongation of the transition times of signals at the input terminals 6 and 7 of each loads A1, A2, . . . , An–1 and An is reverse between the positive input and the negative input, and the times when the respective voltage levels of the positive and the negative input at input terminals 6 and 7 become equal, or substantially equal, are identical, or substantially identical, to each other in every load.

Because each of the loads A1, A2, . . . , An–1 and An is a differential input circuit, the time when a signal is input into each of the loads A1, A2, . . . , An–1 and An is a time when the respective voltage levels of the positive and the negative input at the input terminals 6 and 7 of each of the loads A1, A2, . . . , An–1 and An become equal, or substantially equal, to each other. Thus, the times when the signals input to every loads A1, A2, . . . , An–1 and An are identical, or substantially identical. Therefore, skew, the time difference when a signal to be distributed is input to the respective loads, can be prevented or reduced.

In this way, because the times when a signal is input into the respective loads is identical, or substantially identical, with one another, the skew which may be caused by factors occurring later such as a temperature change is also automatically compensated without requiring man power and special equipment for performing an initial skew adjustment or the like. Thus, it is possible to easily improve the operation speed of a device and make the device perform well.

The signal distributing circuit of the embodiment is very simple because it includes, in addition to n (n is an integer which satisfies n>1) loads to receive signals, one driver and signal lines, positive and negative ones. Therefore, a signal distributing circuit which is not only low in cost but also easy to change its configuration can be implemented. For example, it is easy to change the number of loads. In addition, because the signal distributing circuit uses differential input/output circuits, each of which is connected to two signals of positive and negative ones, common mode noise (for example, noise coupled with variety of a power source or a ground potential) which occurs in the middle of distribution of a signal, are canceled between the positive and the negative inputs at every loads. Therefore, the signal distributing circuit of the embodiment is barely influenced by this noise, which increases when the device speeds up and harms a speedup, and can provide a signal distributing circuit being the most suitable for high-speed operation.

Next, a second embodiment of the present invention will be described in detail.

As apparently seen from the first embodiment, in order to make a signal distributing circuit of the present invention work effectively, a signal needs to reach the input terminals of all loads within transition times of positive and negative signals distributed to the input terminals of each loads. With reference to the signal waveform diagram of FIG. 2, the higher the number of loads, the longer the transition time of a signal distributed to the input terminals of each load becomes. A signal reaching time is proportional to the distance from the differential output circuit to a load. Therefore, if the distance from the differential output circuit to a load is shortened and the mounting density of loads within its specified distance is made high, a signal transfer time to all loads is shortened as a whole and the transition time of a signal is prolonged based on the number of loads, thus, a signal reaches the input terminals of all the loads within the transition time of the signal.

Figure 3:
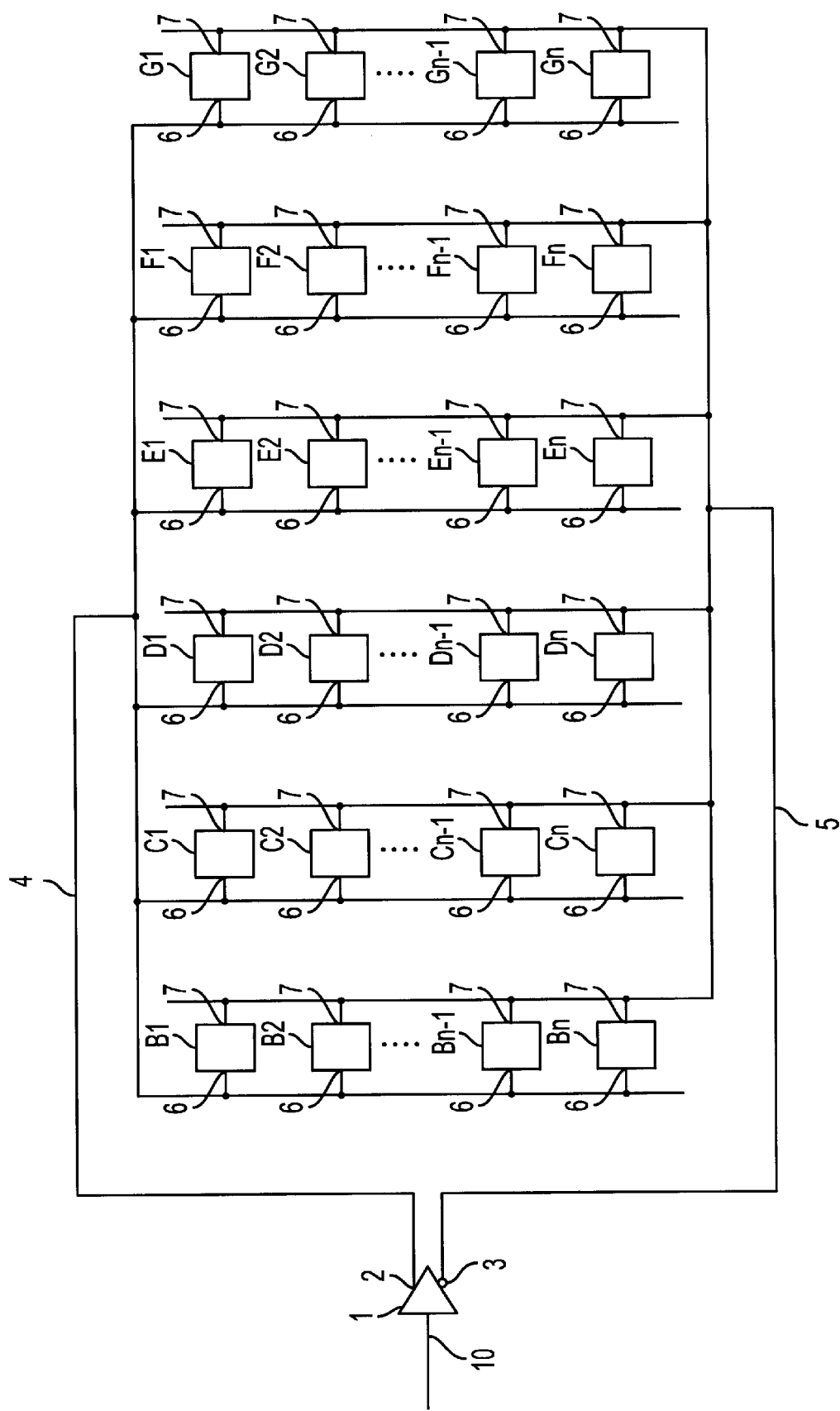
FIG. 3 is a block diagram of a signal distributing circuit of the second embodiment of the present invention.

Referring to FIG. 3, each of signal lines 4 and 5 is branched into a plurality of signal lines. The loads are connected to each of the branched signal lines in the same way as the first embodiment. The elements having same symbols as FIG. 1 are the same configuration as in FIG. 1.

Positive output terminal 2 of driver 1 has positive input terminals 6 sequentially connected thereto through the plural branched signal lines 4 in order of loads B1, B2, . . . , Bn–1 and Bn to G1, G2, . . . , Gn–1, Gn. Negative output terminal 3 of driver 1 has negative input terminals 7 sequentially connected thereto through the plurality of branched signal lines 5 in an order opposite to that of the above-mentioned connection between positive terminal 2 and positive terminals 6, namely, in order of loads Bn, Bn–1, . . . , B2 and B1 to Gn, Gn–1, . . . , G2 and G1.

While a connecting point of signal line 4 and positive input terminal 6 and a connecting point of signal line 5 and negative input terminal 7 of each load are shown in FIG. 3 as if they are apart from each other, as explained in the first embodiment, the points are at the same positions on signal lines 4 and 5 which are arranged in parallel with each other.

In this way, a signal line is branched into a plurality of signal lines, positive output terminal 2 is sequentially connected through the plurality of branched signal lines 4 to the respective positive input terminals 6, and negative output terminal 3 is sequentially connected through the plurality of branched signal lines 5 to the respective negative input terminals 7 in an order opposite to that of connection of positive terminal 2 and positive terminals 6. Therefore, the number of loads within a specified distance increases and the mounting density becomes higher. Because a signal transfer time to all loads is shortened and the transition time of a signal distributed to the input terminals of each load is prolonged, the signal reaches the input terminals of all the loads within the transition time of the positive and the negative signal to be distributed to the input terminals of each load.

This embodiment has been explained with the assumption that the number of loads is B1 to Gn, however, this assumption is for convenience only and it is not limited to this number.

Next, a third embodiment of the present invention will be described in detail.

As seen from the second embodiment, a signal reaching time is proportional to the distance from the differential output circuit to a load, and the greater the number of loads, the longer the transition time of a signal distributed to the input terminals of each load becomes. In other words, as the distance to a load becomes shorter, the signal reaching time becomes proportional to the number of loads, namely, the sum of capacities of the loads. Therefore, if the number of loads can be increased within a short distance to loads, it is possible to make a signal distributing circuit of the present invention more work effectively.

Figure 4:
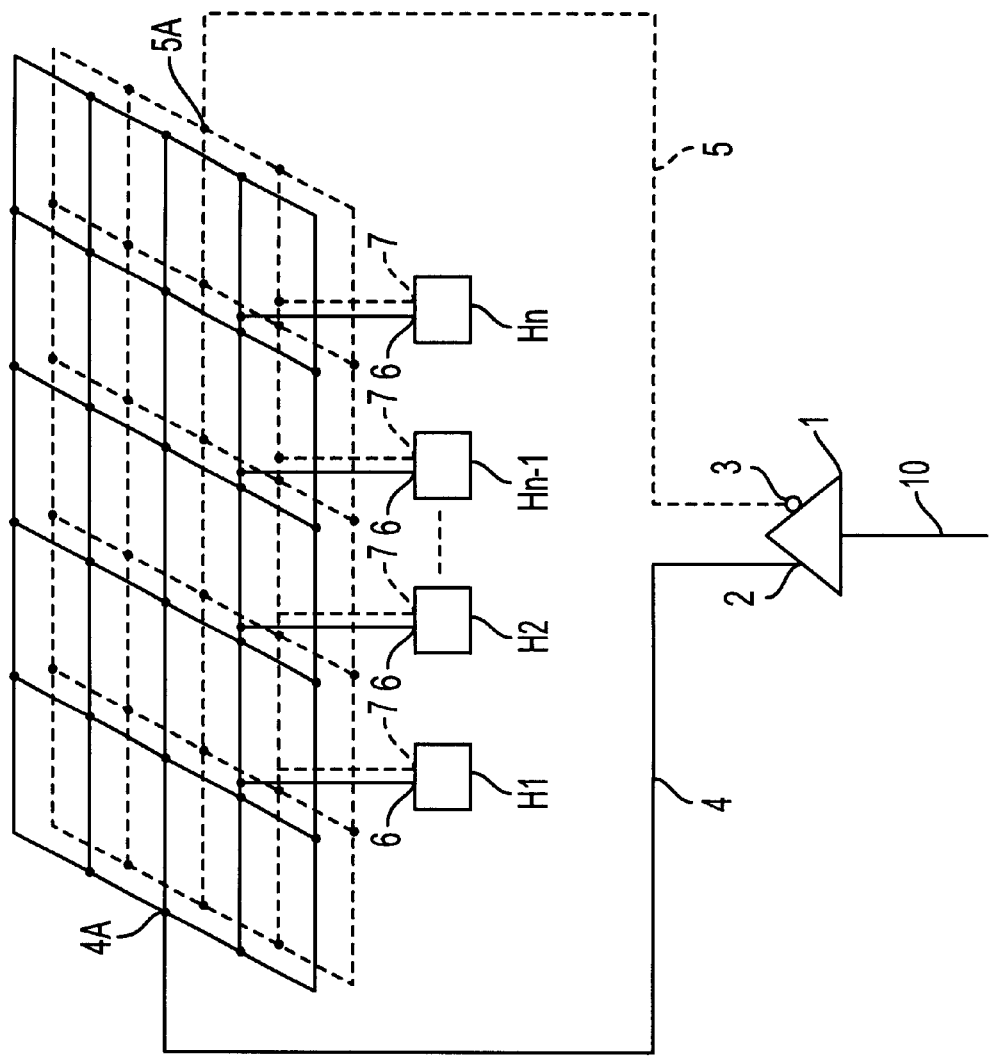
FIG. 4 is a block diagram of the third embodiment of the present invention.
Figure 5:
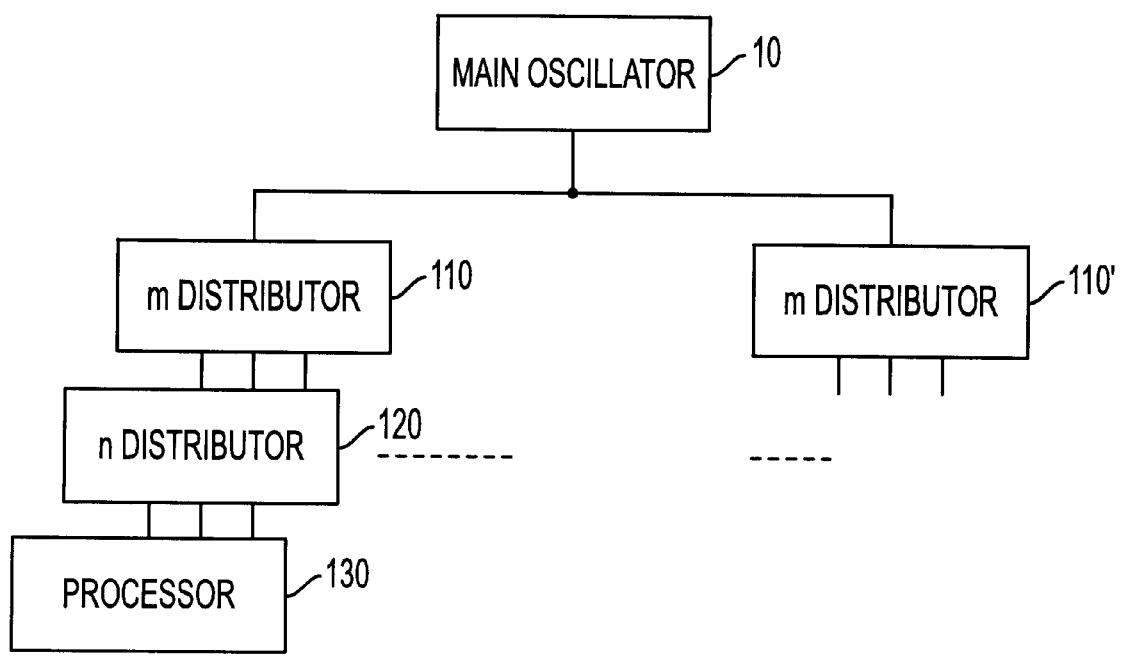
FIG. 5 is a block diagram of the first conventional circuit.
Figure 6A:
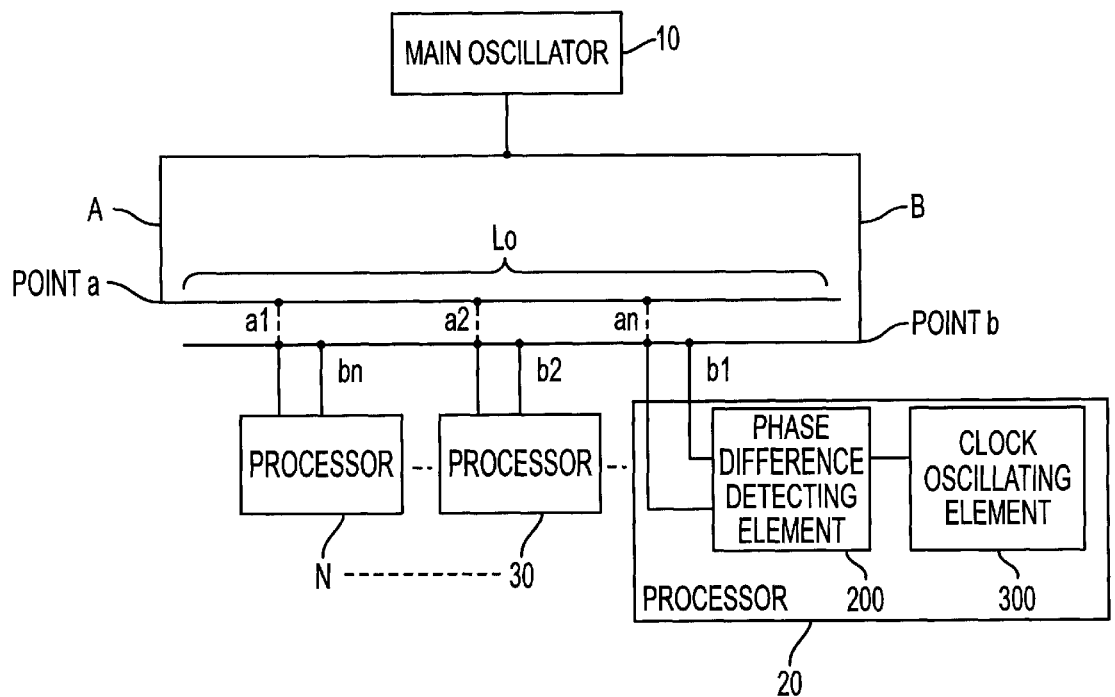
FIGS. 6A and 6B are a block diagram of the third conventional circuit and a diagram showing the operation of the third conventional circuit, respectively.
Figure 6B:
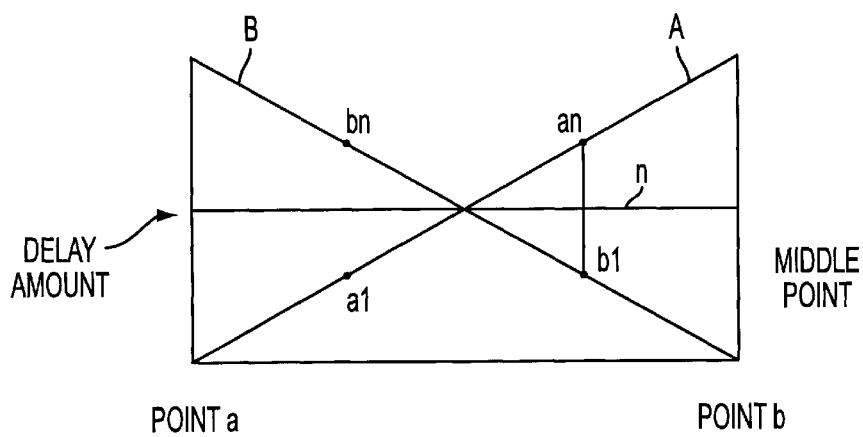
Figure 7:
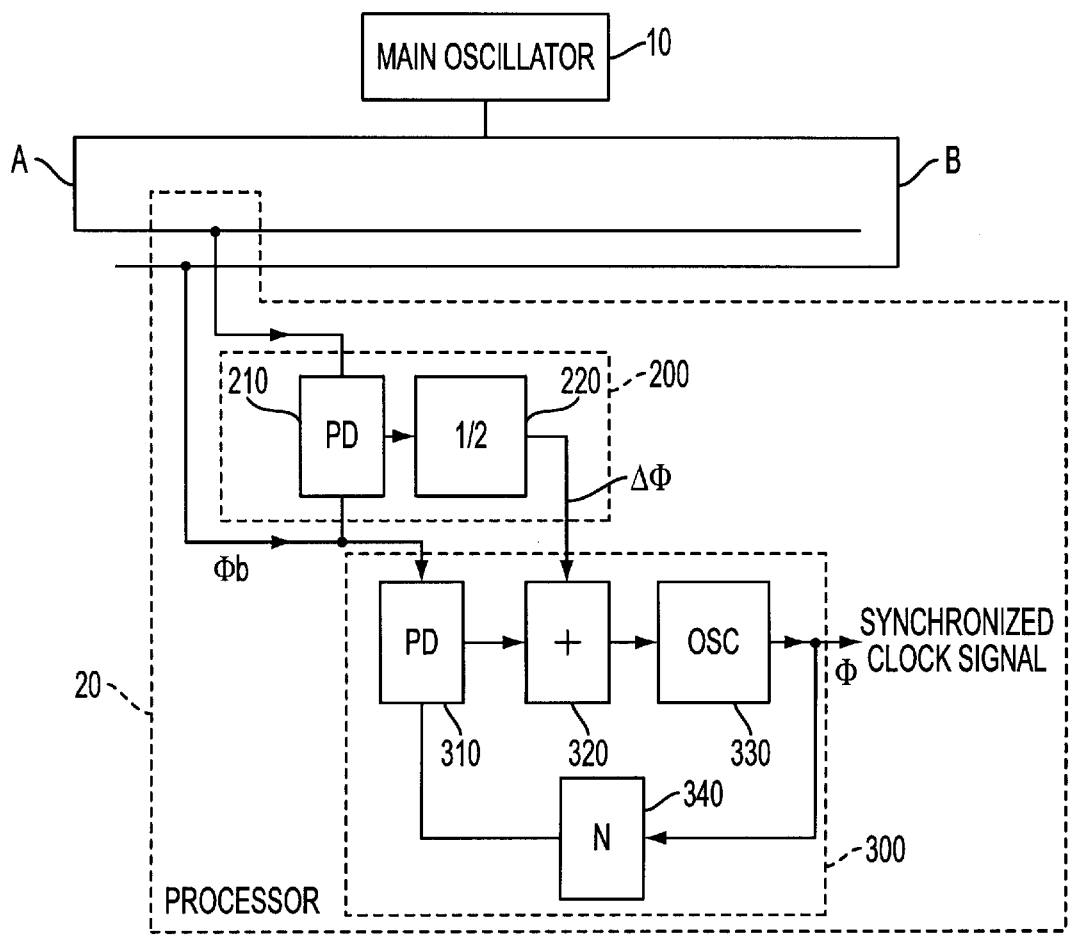
FIG. 7 is a block diagram of a processor shown in FIG. 6.
Figure 8:
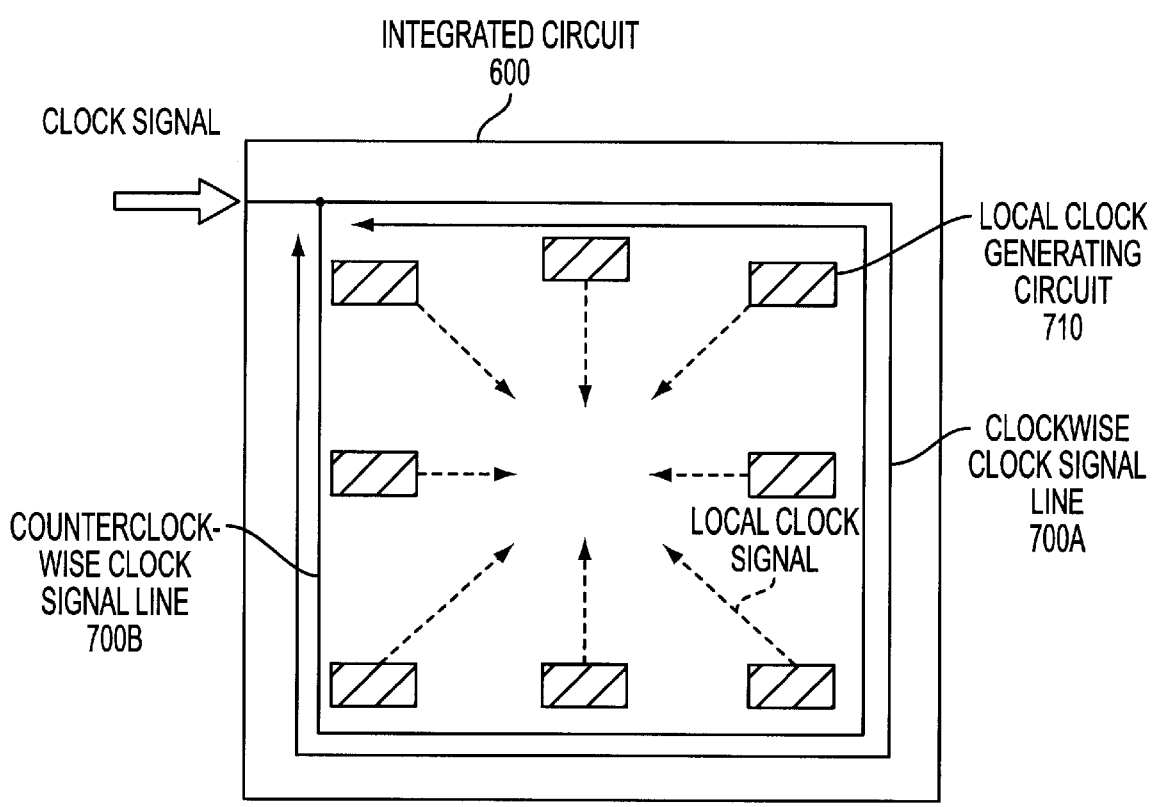
FIG. 8 is a brief diagram which shows the mounting state on an integrated circuit of a signal distributing circuit according to the fourth conventional circuit.
Figure 9:
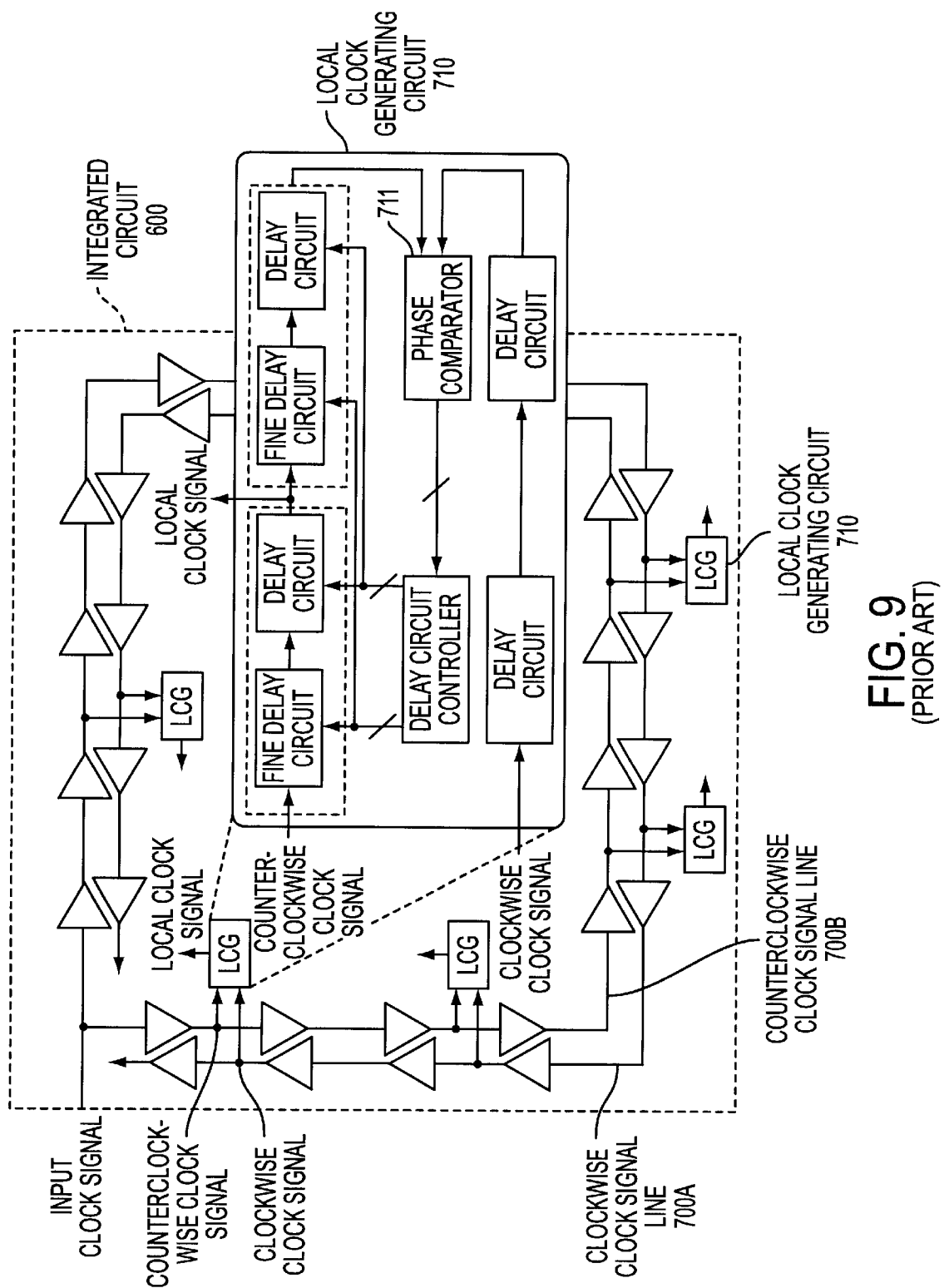
FIG. 9 is a block diagram of a signal distributing circuit according to the fourth conventional circuit.

Referring to FIG. 4, the signal lines are each formed into a lattice shape, and are arranged in parallel with one another. The respective loads are connected to the signal lines at specified positions on the lattice of each of the signal lines in the same way as the first embodiment. While, in the second embodiment, a signal line is branched into a plurality of signal lines and each of the branched signal lines has the respective loads connected to it in the same way as the first embodiment.

Positive output terminal 2 of driver 1 is connected to signal line 4. Negative output terminal 3 of driver 1 is connected to signal line 5. Signal lines 4 and 5 are each formed in a lattice shape and are arranged in parallel with each other. Positive output terminal 2 is sequentially connected to the respective positive input terminals 6 through the lattice-shaped signal line 4 in order of the loads H1, H2, . . . , Hn–1 and Hn. Negative output terminal 3 is sequentially connected to negative input terminals 7 through the lattice-shaped signal line 5 in an order opposite to that of the connection between positive terminal 2 and positive terminals 6, namely, in an order of the loads Hn, Hn–1, . . . , H2 and H1.

Because signal lines 4 and 5 are each formed in a lattice shape, a signal is propagated not only in one direction but also to the left and the right direction through an intersecting point of the lattice. Accordingly, signals propagate radially from branch points 4A and 5A when branch points 4A and 5B are bases for signal lines 4 and 5. In other words, in this embodiment, it can be said that a signal transfer time is determined by the area expanding from the branch points 4A and 5B of signal lines 4 and 5.

While a connecting point of lattice-shaped signal line 4 and positive input terminal 6 and a connecting point of lattice-shaped signal line 5 and negative input terminal 7 of each load are shown in FIG. 4 as if they are apart from each other, and lattice-shaped signal lines 4 and 5 also are shown as if they are apart from each other, as explained in the first and the second embodiments, this is solely for the purpose of convenience of explanation and the points are at the same positions on signal lines 4 and 5 which are arranged in parallel with each other. And although this embodiment is described based on the assumption that the number of loads is H1, H2, . . . , Hn−1, Hn, it is not limited to this number. And each of the signal lines arranged in parallel with each other may be formed into the shape of not only a lattice, but also a plate or a strip.

In this way, because the signal lines are each formed into a lattice shape and arranged in parallel with each other, and each load is connected to each signal line at a specified position on the lattice, the number of loads can be increased and an effect similar to the second embodiment can be obtained. Namely, when the signal lines are each formed in a lattice shape, the number of loads within a specified distance is increased and the mounting density of the loads is also increased. Because a signal transfer time to all loads is shortened and the transition time of a signal distributed to the respective loads is prolonged, a signal reaches the input terminals of all the loads within the transition time of the positive and the negative signal to be distributed to the input terminals of each load.

Accordingly, it is apparent that the signal distributing circuit of the third embodiment works very effectively, for example, as a signal distributing circuit which distributes a signal to a number of densely-mounted loads (for example, flip-flop circuits), such as a clock distributing circuit inside an integrated circuit or the like.

While this invention has been described in conjunction with the preferred embodiments described above, it will now be possible for those skilled in the art to put this invention into practice in various other manners.

What is claimed is:

1. A signal distributing circuit comprising:
   a first element which outputs a first signal and a second signal, wherein the second signal is an inverse signal of said first signal;
   a first signal line on which said first signal is transmitted;
   a second signal line on which said second signal is transmitted; and
   a plurality of second elements each of which is connected to said first signal line in a first order and connected to said second signal line in a second order, wherein said second order is a reverse order to that of said first order,
   wherein each of said first signal line and said second signal line is branched.

2. The signal distributing circuit as claimed in claim 1, wherein said first element includes a differential output circuit.

3. The signal distributing circuit as claimed in claim 1, wherein each of said second elements includes a differential input circuit.

4. The signal distributing circuit as claimed in claim 1, wherein said first signal line includes first and second branch lines;
   wherein said second signal line includes third and fourth branch lines;
   wherein a first group of said second elements are connected to said first branch line in a third order and to said third branch line in a reverse order to that of said third order; and
   wherein a second group of said second elements are connected to said second branch line in a fourth order and to said fourth branch line in a reverse order to that of said fourth order.

5. The signal distributing circuit as claimed in claim 4, wherein said first branch line and said third branch line are parallel.

6. The signal distributing circuit as claimed in claim 5, wherein said second branch line and said fourth branch line are parallel.

7. A signal distributing circuit comprising:
   a first element which outputs a first signal and a second signal, wherein said second signal is an inverse signal of said first signal;
   a first signal line on which said first signal is transmitted;
   a second signal line on which said second signal is transmitted; and
   a plurality of second elements, each of which is connected to said first signal line in a first order and connected to said second signal line in a second order, wherein said second order is opposit to that of said first order,
   wherein said first signal line includes a first part formed in a lattice shape, wherein said second signal line includes a second part formed in a lattice shape, and wherein parts formed in a lattice shape of said first signal line and said second signal line are parallel.

8. A signal distributing circuit comprising:
   a first element which outputs a first signal and a second signal, wherein the second signal is inverse to that of said first signal;
   a first signal line on which said first signal is transmitted;
   a second signal line on which said second signal is transmitted; and
   a plurality of second elements, each of which is adapted to receive said first signal from said first signal line and said second signal from said second signal line, wherein times when levels of said first signal and said second signal arrive at a corresponding second element are equal, or substantially equal, are coincident, or substantially coincident, for each second element, and wherein each of said first signal line and said second signal line is branched.

9. The signal distributing circuit as claimed in claim 8, wherein said first element includes a differential output circuit.

10. The signal distributing circuit as claimed in claim 8, wherein each of said second elements includes a differential input circuit.

11. The signal distributing circuit as claimed in claim 8, wherein said first signal line includes first and second branch lines;
    wherein said second signal line includes third and fourth branch lines;
    wherein a first group of said second elements is adapted to receive said first signal from said first branch line and said second signal from said third branch line; and
    wherein a second group of said second elements is adapted to receive said first signal from said second branch line and said second signal from said fourth branch line.

12. The signal distributing circuit as claimed in claim 11, wherein said first branch line and said third branch line are parallel.

13. The signal distributing circuit as claimed in claim 12, wherein said second branch line and said fourth branch line are parallel.

14. A signal distributing circuit comprising:

a first element which outputs a first signal and a second signal, wherein said second signal is inverse to that of said first signal;

a first signal line on which said first signal is transmitted;

a second signal line on which said second signal is transmitted; and a plurality of second elements, each of which inputs said first signal from said first signal line and said second signal from said second signal line, wherein times when levels of said first signal and said second signal are equal, or substantially equal, are coincident, or substantially coincident, in every second element, wherein said first signal line includes a first part formed in a lattice shape, wherein said second signal line includes a second part formed in a lattice shape, wherein each of said second elements inputs said first signal from said first part and said second signal from said second part, and wherein parts formed in a lattice shape of said first signal line and said second signal line are parallel.

* * * * *